United States Patent Office 3,330,730
Patented July 11, 1967

3,330,730
PRESSURIZED EMULSION QUICK BREAKING
FOAM COMPOSITIONS
Manuel Emil Hernandez, Belleville, N.J., assignor to
Colgate-Palmolive Company, New York, N.Y., a corporation of Delaware
No Drawing. Filed Aug. 3, 1962, Ser. No. 214,477
18 Claims. (Cl. 167—85)

This invention relates to new compositions of matter. More particularly, the invention relates to pressurized emulsions which form quick breaking foams when pressure is released and the pressurizing gas expands.

In general the new pressurized emulsions of this invention have an oily phase and an aqueous phase and comprise an oil which is insoluble in water, a hydrophilic carboxy vinyl polymer, an emulsifier, water and nitrous oxide to produce a quick breaking foam, as pressure is released and the gas expands, when the emulsion is dispensed.

The water-insoluble oils include saturated and unsaturated hydrocarbon oils and the higher molecular weight fatty acid esters, which are derived from animal or vegetable products, and other oleaginous materials of similar properties. Among the oils which can be utilized in preparing the new emulsions of the invention are mineral oils, such as paraffin oil and homologs thereof, petrolatum, and others obtained from petroleum and its products. Among such useful oils are those containing from about 12 to about 30 carbon atoms. These oils have different viscosities; they may be either light or heavy oils. Suitable oils also include the triglycerides in which the fatty acid portion of the molecule contains from about 10 to 18 carbon atoms. The choice of any particular oil used will depend upon the end use for which the emulsion is intended. For example, in a pressurized hair dressing, where control of the hair is desired, a heavier oil will be utilized in order to keep the hair in place. On the other hand, where it is desirable to give the hair a brilliant luster and where control is not a governing factor, a lighter oil may be employed. The oils most suitable for a particular intended purpose can be determined by routine testing and may be selected for use on such a basis.

The carboxy vinyl polymers employed in the new emulsions are generally synthetic mucilaginous hydrophilic substances which preferably contain carboxylic salt groups. It is preferred to employ cross-linked polymers which are produced by the polymerization or intermolecular reaction of two or more different monomers containing polyfunctional groups. The term polymer includes, therefore, copolymers. Suitable examples of such polymers are disclosed in British patent specification No. 799,951, published Aug. 13, 1958 and U.S. Patent 2,798,053, granted July 2, 1957. The polymers disclosed therein are compositions comprising a cross-linked interpolymer of (a) a mono-olefinic monomeric material comprising at least 25 percent by weight of a monomeric olefinically-unsaturated carboxylic acid containing at least one activated carbon-to-carbon double bond, such as acrylic acid, and (b) from about 0.01 to 10.0 percent by weight of a polyunsaturated cross-linking agent containing a plurality of polymerizable vinyl or crotyl groups, such as a polyalkenyl polyether of a polyhydric alcohol. More particularly, the preferred interpolymers are derived from a mixture of acrylic acid and a polyether of sucrose in which the hydroxyl groups which are modified are etherified with at least two allyl groups per molecule. A specific example of such a material is one containing about 97.5 to 99.8 percent by weight of acrylic acid and about 0.2 to about 2.5 percent by weight of a monomeric polyether of sucrose in which the hydroxyls are etherified with at least two and preferably about five to about six allyl groups per sucrose molecule. Such carboxylic polymers are available commercially in the free acid form and are preferably at least partially neutralized by the presence of bases such as alkali and alkaline earth metal hydroxides or amine bases which are defined more particularly hereinbelow.

Generally any basic compound can be utilized to neutralize the polymers defined above. Such compounds include sodium and potassium hydroxides and lithium hydroxide and the like. Examples of amine bases useful in the practice of the invention are mono-, di- and tri-aliphatic amines containing from 1 to about 20 carbon atoms in the aliphatic carbon chain and wherein the substituent groups can be the same or different in the di- and tri-compounds. However, the amines containing one or more aliphatic groups containing 6 to 18 carbon atoms are especially preferred. Specific useful amine bases include mono-, di- and tri-hexyl, lauryl and stearyl amines and the like. Additional amine bases are alkylolamines containing from 1 to 12 carbon atoms in the alkyl group such as mono-, di- and tri-methanolamines, ethanolamines, propanolamines, etc. and the like. A particularly effective alkylolamine is triethanolamine.

Suitable oil-in-water emulsifiers are anionic and nonionic emulsifiers or combinations thereof. Preferably, those employed in the emulsions of this invention have an acceptable hydrophile-lipophile balance (HLB) such as will promote the formation of a stable emulsion which is capable of forming a quick breaking foam according to the invention. The hydrophile-lipophile balance can be based on either analytical or composition data and for many of the suitable polyhydric alcohol-fatty acid ester emulsifiers can be calculated from the formula, (A) $$HLB = 20\left(1 - \frac{S}{A}\right)$$

wherein S is the saponification number of the ester and A is acid number of the acid. In those instances where the fatty acid esters, for example oxyethylene types of esters such as lanolin ester, beeswax ester and the like, do not give good saponification number data the following formula can be utilized:

(B) $$HLB = \frac{E + P}{5}$$

wherein E is the weight percentage of oxyethylene content and P is weight percentage of polyhydric alcohol content (glycerol, sorbitol, etc.). In the emulsifiers wherein only ethylene oxide is used as the hydrophilic portion and for fatty alcohol-ethylene oxide condensation products, the equation B above may be simplified to read as follows:

(C) $$HLB = \frac{E}{5}$$

wherein E is the percentage of oxyethylene content. On the other hand, in those instances where the emulsifier does not exhibit behavior which will permit HLB values to be calculated, the routine tests normally must be used to determine their usefulness in the emulsions of this invention. In general, any emulsifier which has an HLB value of about 9 or more can be employed in the practice of the instant invention. Anionic type emulsifiers, that is those where the active or oil soluble portion of the ionizing molecule is the negative ion, include the fatty acid soaps such as sodium, potassium and triethanolamine soaps and the like. Nonionic types, i.e., those in which the affinity for water is due to the presence of nonionizing polar groups, include fatty acid esters and ethers of polyhydric alcohols, such as the esters and ethers of polyethylene glycols and modified sugars and also substituted fatty acid amides and alkylolamides. Surface active agents in combination with long chain fatty materials have been found useful in emulsifying the oily materials. These blends are exemplified by mixtures of alcohols and surface active agents, such as cetyl alcohol or cholesterol with sodium cetyl sulfate, or cetyl alcohol with ethylene oxide condensates containing 20 to 30 mols of ethylene oxide. Additional mixtures or blends include glyceryl and glycol esters with water soluble surface active agents, either anionic or nonionic, such as glyceryl monostearate with potassium stearate or cetyl alcohol with ethylene oxide condensates which contain about 20 to 30 mols of ethylene oxide. Further mixtures or blends of emulsifiers include combinations of polyglcol esters of fatty acids and polyglycol ethers of fatty alcohols with water soluble surface active agents and mixtures or blends of soaps with free fatty acids. Preferably, the emulsifiers include a group having a chain length of about 12 to 18 carbon atoms.

Specific examples of useful emulsifiers include polyoxyethylene sorbitan mono-oleate, polyoxyethylene esters of fatty and resin acids, polyoxyethylene cetyl ether, polyoxyethylene sorbitan tristearate, polyoxyethylene lanolin derivatives, polyoxyethylene mono-oleate, polyoxyethylene monopalmitate, polyoxyethylene stearyl alcohol, polyoxyethylene oleyl alcohol, polyoxyethylene sorbitol lanolin derivative, polyoxyethylene akyl aryl ethers, such as polyoxyethylene oleyl ether and polyoxyethylene glycol monopalmitate and the like. A particularly effective group of emulsifiers coming within the broad classification of these esters set forth are those in which the polyoxyethylene group has an average molecular weight in a range of about 200 to 600. Of these, preferred polyoxyethylene esters, e.g., polyoxyethylene 400 monococate, are especially useful in the preparation of the invented pressurized emulsions. Although the specific emulsifiers set forth above are not exclusive, they generally are among the most effective oil-in-water emulsifiers which are utilized in practicing the invention. For the sake of simplicity, suitable compounds for causing emulsification will be referred to hereafter in this specification and in the appended claims merely as emulsifiers.

As mentioned heretofore, the pressurized emulsions of this invention are oil-in-water emulsions. The water constitutes the continuous phase of the emulsion with the oil or oils dispersed therein. The carboxyvinyl polymer defined above is soluble in the water phase. When pressurized with nitrous oxide, such compositions form desired quick breaking foams.

The nitrous oxide is soluble in the emulsion. It is beneficial to employ this gas in combination with other inert gases, such as nitrogen and argon. In general, if nitrous oxide is employed in a mixture with one or more inert gases, the additional gases are present in minor amounts. Although the emulsions normally cannot be satisfactorily pressurized with the well-known liquefied fluorinated and chlorinated hydrocarbon propellants (Freons), these propellants may be utilized in very minor amounts, less than about 3 percent by weight, based on the total weight of the emulsion, along with nitrous oxide to pressurize emulsions and achieve a quick breaking foam when pressure is released and the gas expands in the atmosphere. However, the use of such liquefied aerosol propellants in large amounts has a tendency to stabilize the foam and will prevent the foamed emulsions from breaking down easily when pressure is released and the gas expands in the atmosphere, thereby achieving an effect opposite of that desired.

The amounts of the particular constituents employed in the pressurized emulsions of the invention can be varied widely. The oils can be employed in a range of about 5 percent to about 60 percent by weight, based on the total weight of the emulsion and preferably are utilized in a range of about 10 to about 40 percent. The carboxyvinyl polymer is normally used in relatively minor amounts within a range of about 0.1 percent to about 0.5 percent and preferably in a range of about 0.2 percent to about 0.4 percent by weight. The neutralizing bases such as the hydroxides and amines are generally employed in dilute solutions for the sake of manufacturing convenience. However, it is preferred that enough base be employed to at least partially and preferably substantially completely neutralize the amount of polymer in any particular emulsion. In general, the base can be present in the emulsion in a range of about .05 percent to about 2.0 percent by weight, based on the total weight of the emulsion, and is preferably present in a range of about 0.1 about 1.5 percent.

The emulsifying agents described above are present in the new pressurized emulsions of the invention in concentrations sufficient to insure stability over a relatively long period of time. In this connection, the emulsifying agent can be present in the new emulsions in a range of about .5 percent to about 10 percent by weight and preferably in a range of about 1 to about 3 percent.

The water is employed in a range of about 40.0 percent to about 94 percent by weight, based on the total weight of the composition and preferably in a range of about 50 to 70 percent by weight.

As pointed out hereinabove, the presence of nitrous oxide as a pressurizing gas in the new emulsions, together with the other constituents thereof, produces a foam which breaks down quickly upon release of pressure and expansion of the gas in the atmosphere. The nitrous oxide is utilized in an amount at least sufficient to produce such a quick breaking foam. Generally, the presence of nitrous oxide dissolved in the emulsion, in a range of about 0.2 to 1.5 percent by weight and preferably in a range of 0.4 to 0.8 percent by weight has been found beneficial in producing a foam which breaks rapidly when rubbed between the palms of the hands. For example, the invented emulsions will break down into a pool when rubbed between the palms of the hands in a period of from about 1 to 15 seconds. In addition to the dissolved gas, additional nitrous oxide, undissolved, may be present to raise the pressure in the dispensing container to that suitable for satisfactory discharge of the invented emulsions, about 60 to 200 pounds per square inch gauge, preferably 75 to 160 pounds per square inch gauge. As pointed out hereinabove the nitrous oxide is soluble in the emulsions. The dissolution of the gas in the emulsions consequently causes a pressure drop after a period of storage of about 2 weeks to one month. For example, in a conventional "6 ounce" aerosol container charged with about 130 grams of emulsion and subsequently pressurized to 140 pounds per square inch gauge, the pressure dropped to about 75 to 80 pounds per square inch gauge during the stated time interval. The pressure drop can even be accelerated more quickly by agitation of the charged containers, the pressure drop taking place over a period of about four hours. In those instances where an additional gas such as inert nitrogen or argon is utilized with nitrous oxide, the added inert gas aids in maintaining the desired pressure. However, in order that the emulsion will form a quick breaking foam upon discharge, it is generally preferred, in such a propellant mixture, that the inert gas, such as nitrogen or argon, should be utilized with the nitrous oxide only in an amount sufficient to maintain the desired dispensing pressure in the container. It is to be noted that in such a mixture the nitrous oxide may be present in a ratio of about 10:1 with respect to the added inert gas, often within the range of about 4:1 to 40:1.

In an emulsion prepared in accordance with the present invention and which contains a plurality of oils or a plurality of emulsifiers, the total amount in weight percent of the emulsifier and oil, for best results, should be within the ranges set forth hereinabove. The oils and emulsifiers present may function in such a manner as to accomplish more than one purpose. For example, the paraffin oils, when employed herein, serve to give good consistency and body to the emulsions. At the same time, however, they also act as protective coatings for the hair, for example, in pressurized hair dressings made in accordance with this invention. In this regard, where a nonionic ethylene oxide, fatty alcohol and lanolin complex is utilized as a constituent in the emulsion, it may act as a grooming agent to impart luster and softness to the hair or the skin as well as functioning in its role as an emulsifier. When a plurality of oils and/or emulsifiers is present in a particular emulsion, it is to be understood that although the total amounts of oil and/or emulsifier, for best results, should be within the ranges established hereinabove, the amounts and proportions of oils and emulsifiers, with respect to each other, can be varied.

The pressurized emulsions of this invention can be prepared in a relatively simple manner. In general, the oils, such as mineral oil, petrolatum and paraffin wax, and the emulsifier can be mixed together in an aqueous solution of the carboxy vinyl polymer. Caustic soda or other base is then added to the dispersion to neutralize the polymer along with additional water. Subsequently, various other optional constituents, more specifically mentioned hereinbelow, can then be added to the dispersion while it is constantly being agitated at about room temperature or slightly above (25° to 80° C.) until a stable emulsion is formed. The emulsion so formed is then pressurized in conventional aerosol containers with nitrous oxide or mixtures of nitrous oxide and inert gases mentioned hereinabove by conventional procedures. A preferred method for preparing the emulsions comprises mixing mineral oil, petrolatum, emulsifier and paraffin wax in a homogenizing mixer at about 70° to 80° C. and thoroughly agitating the mixture until homogeneity is obtained. Next, a one percent aqueous solution of the carboxy vinyl polymer in distilled water is slowly added with agitation. After agitation of the aqueous polymer solution is completed, an aqueous solution of base is then added to the dispersion, which is continuously agitated to insure a homogeneous distribution of all the constituents. Finally, optional ingredients such as humectants and antimicrobial agents and perfumes are added to the dispersion and agitation is continued until a stable homogeneous emulsion is obtained. The emulsion so prepared is then pressurized by conventional pressurization steps as stated hereinabove.

A variety of optional constituents may be incorporated into the quick breaking pressurized emulsions of this invention. Such constituents include humectants such as propylene glycol, glycerin or sorbitol which are generally employed in an amount of about 5 to 12 percent by weight, based on the total weight of the emulsion, preferably about 8 to 10 percent. Antimicrobial compositions, preservatives, such as parahydroxybenzoates, and perfumes are normally employed in relatively minor amounts of about 0.1 to 0.5 percent by weight. Additional optional constituents such as sun screen chemicals and insect repellents may also be incorporated in the new pressurized emulsions of the invention. When a sun screen or ultraviolet light absorber is utilized, it is normally employed in a range of about 1 to 10 percent by weight, based on the total weight of the emulsion. The insect repellent materials are generally present in the emulsions in a range of about 2 to about 15 percent by weight and preferably in a range of about 5 to 10 percent. Among the useful sun screens are the para-aminobenzoates such as para-aminomethyl benzoate, para-aminoethyl benozate, para-amino propyl benzoate, para-aminoamyl benzoate, para-aminoisoamyl benzoate etc. and the like. Another useful sun screen is homomenthyl salicylate. Specific examples of useful insect repellents are meta diethyl toluamide and 2-ethyl 1, 3 hexanediol and the like.

The pressurized emulsions of this invention can be employed in a wide variety of cosmetic preparations. For example, the emulsions can be utilized in making skin creams and cosmetic facial preparations, but are particularly useful as hair dressings to impart control, softness and brilliance to the hair. They may be relatively viscous or very fluid compositions which, regardless of their viscosity, still have the property of forming a foam which is relatively quick breaking when the emulsions are depressurized by release to the atmosphere or rubbed between the palms of the hands. Utilization of nitrous oxide to pressurize the invented emulsions permits the preparation of stabilized pressurized emulsions in contrast to other water soluble gases which when employed to pressurize the emulsions sharply disturb the stability characteristics thereof. The utilization of the carboxy vinyl polymer results in the formation of emulsions which are highly stable and which have good body in contrast to like emulsions formed with other water soluble polymeric compositions. The ability of the foam to break down quickly provides emulsions which can be easily spread over the areas to which they are to be applied in smaller amounts, thereby resulting in an advantage over emulsions which form stable foams.

In order to illustrate the present invention more fully, the following illustrative examples are set forth. In the examples all parts and percents are by weight unless otherwise stated.

*Example I*

26.5 parts of mineral oil, 8 parts of petrolatum, 1.00 part of polyethylene glycol 400 monococate, 3 parts of paraffin wax, 0.125 part of nonionic emulsifier, an ethylene oxide-fatty alcohol and lanolin complex (Neocol 5192, manufactured by Dispergent company, Guilford, Conn.) and 0.009 part of lauryl amine were added to an Eppenbach Homomixer at about 65° C., with constant agitation. After the constituents were agitated for a sufficient length of time (about 5 minutes) to result in a homogeneous mixture, there was added thereto, previously heated to the same temperature, 14.1 parts of a 1 percent aqueous solution of a copolymer of about 99 percent by weight of glacial acrylic acid and about 1 percent by weight of polyallyl sucrose in which the sucrose molecule has an average of about 5 to 6 allyl groups. Agitation was continued with addition of 38.7 parts of deionized water, followed by the addition of 0.23 part of a 24.6 percent aqueuos solution of sodium hydroxide. Next 8.0 parts of propylene glycol, a humectant, were added to the mixture followed by 0.20 part of perfume. Agitation was continued for about 15 minutes until a stable homogeneous emulsion was obtained. 130 grams of the emulsion so formed were cooled to room temperature (about 25° C.) and were then pressurized in a conventional dispensing aerosol container to 40 pounds per square inch gauge pressure of nitrogen and subsequentially this was brought to 140 pounds per square inch gauge with nitrous oxide. After about two weeks storage the pressure dropped to about 80 pounds per square inch gauge. When the emulsion was dispensed to the atmosphere it formed a foam which broke down completely and quickly, in less than 5 seconds when rubbed between the palms of the hands. Application of the material to the hair gave it a pleasing texture and appearance and good control, keeping the hair in place after combing.

*Example II*

A pressurized hair dressing was prepared which contained the following constituents:

PART I

| | Parts |
|---|---|
| Heavy mineral oil | 26.50 |
| White petrolatum | 8.00 |
| Paraffin wax | 3.00 |
| Polyethylene glycol 400 monococate | 1.00 |

| | Parts |
|---|---|
| Nonionic emulsifier (Neocol 5192) | 0.125 |
| Lauryl amine | 0.0985 |

PART II

| | |
|---|---|
| A 1 percent aqueous solution of a copolymer of about 99% by weight of glacial acrylic acid and about 1% by weight of poly alkyl sucrose in which the sucrose molecule has an average of about 5 to 6 allyl groups | 14.10 |
| Water | 35.2405 |

PART III

| | |
|---|---|
| Sodium hydroxide (24.6% aqueous solution | 0.228 |
| Water | 3.5080 |

PART IV

| | |
|---|---|
| Propylene glycol | 8.00 |

PART V

| | |
|---|---|
| Perfume | 0.20 |

The constituents in Part I were added to an Eppenbach Homomixer at about 65° C., with constant agitation. After adding the lauryl amine, agitation was continued for a sufficient length of time (about 5 minutes) to result in a homogeneous mixture. Part II, the constituents of which had been previously mixed together and heated to the same temperature, was then added to Part I. Agitation was continued and Part III, the constituents of which were previously mixed together, was added to the mixer. Finally Part IV and Part V were sequentially added to the mixture while agitation was continued. After an additional 15 minutes of agitation, a stable homogeneous emulsion was obtained.

130 grams of the resulting emulsion were cooled to room temperature (about 25° C.) and were then pressurized in a conventional dispensing aerosol container to 40 pounds per square inch gauge pressure with nitrogen and then this was brought to 140 pounds per square inch gauge with nitrous oxide. After about 2 weeks storage, the pressure dropped to about 80 pounds per square inch gauge. The resulting aerosol composition was an excellent hair dressing and had properties similar to that of Example I, forming a foam which broke down completely and quickly in less than 5 seconds when rubbed between the palms of the hands.

*Example III*

An aerosol sun screen composition was prepared which contained the following constituents in the stated amounts:

PART I

| | Parts |
|---|---|
| Heavy mineral oil | 13.25 |
| Paraffin wax | 5.00 |
| N,N-dimethyl isoamyl p-amino benzoate | 1.20 |
| Polyethylene glycol 400 monococate | 1.00 |
| Laurylamine | 0.0985 |
| Polyoxyethylene lauryl ether containing 4 oxyethylene groups | 0.80 |
| Polyoxyethylene lauryl ether containing 23 oxyethylene groups | 1.20 |

PART II

| | |
|---|---|
| A 1 percent aqueous solution of a copolymer of about 99% by weight of a glacial acrylic acid and about 1% by weight of poly alkyl sucrose in which the sucrose molecule has an average of about 5 to 6 allyl groups | 21.00 |

PART III

| | |
|---|---|
| Polyethylene glycol having an average molecular weight of 600 | 5.00 |
| Sodium salt of ethylene diamine tetraacetic acid | 0.20 |

PART IV

| | Parts |
|---|---|
| Sodium hydroxide, 24.6 percent aqueous solution | 0.392 |
| Deionized water | 50.76 |

PART V

| | |
|---|---|
| Perfume | 0.10 |

The constituents of Part I were added to an Eppenbach Homomixer at about 65° C. with constant agitation in the order shown. After final addition of the polyether, agitation was continued for a sufficient length of time (about 5 minutes) to result in a homogeneous mixture. Part II, the constituents of which had been previously mixed together and heated to the same temperature, was added to Part I. Agitation was continued and Part III, the constituents of which were previously mixed together, was added to the mixer. Finally, Part IV and Part V were sequentially added to the mixture while agitation was continued. After an additional 15 minutes of agitation a stable homogeneous emulsion was obtained.

130 grams of the emulsion were then charged to a conventional aerosol container, pressurized to 40 pounds per square inch gauge with nitrogen and subsequently pressurized to 140 pounds per square inch gauge with nitrous oxide. After about 4 hours of vigorous shaking, the pressure dropped to about 80 pounds per square inch gauge. The resulting aerosol sun screen product produced a foam which broke completely and quickly in less than 5 seconds when rubbed between the palms of the hands and was easily distributed in economic amounts over the areas of the body to be protected.

*Example IV*

An aerosol sun screen composition was prepared in accordance with the procedure in the foregoing example and contained the following specific constituents in the stated amounts including a different sun screen agent and an insect repellant.

PART I

| | Parts |
|---|---|
| Heavy mineral oil | 20.00 |
| Paraffin wax | 8.00 |
| Glyceryl p-amino benzoate | 2.00 |
| Meta diethyl toluamide | 2.00 |
| Polyethylene glycol 400 monococate | 1.00 |
| Laurylamine | 0.0985 |
| Polyoxyethylene lauryl ether containing 4 oxyethylene groups | 2.80 |
| Polyoxyethylene lauryl ether containing 23 oxyethylene groups | 0.20 |

PART II

| | |
|---|---|
| A 1 percent aqueous solution of a copolymer of about 99% by weight of a glacial acrylic acid and about 1% by weight of poly alkyl sucrose in which the sucrose molecule has an average of about 5 to 6 allyl groups | 21.00 |

PART III

| | |
|---|---|
| Polyethylene glycol having an average molecular weight of 1500 | 5.00 |
| Sodium salt of ethylene diamine tetraacetic acid | 0.20 |

PART IV

| | |
|---|---|
| Sodium hydroxide, 19.01 percent aqueous solution | 0.392 |
| Deionized water | 37.21 |

PART V

| | |
|---|---|
| Perfume | 0.10 |

130 grams of the above formulation was then charged to a conventional aerosol container, pressurized to 40 pounds per square inch gauge with nitrogen and then to 140 pounds per square inch gauge with nitrous oxide.

The resulting aerosol sun screen product produced a foam which broke in less than 5 seconds when rubbed between the palms of the hands and which was easily distributed in economic amounts over the areas of the body to be protected.

Numerous variations and modifications of the embodiments of this invention may be made without departing from the spirit and scope thereof. Accordingly, the invention is not to be restricted to the specific embodiments set forth herein except as defined in the appended claims.

What is claimed is:

1. A pressurized emulsion which has an oily phase and an aqueous phase and which produces a quick breaking foam after pressure is released and the pressurizing gas expands and said foam breaks substantially completely within from 1 to 15 seconds, comprising water insoluble oil, substantially completely neutralized hydrophilic cross-linked interpolymer of a mono-olefinic monomer comprising at least about 25 percent by weight of an olefinically unsaturated carboxylic acid containing at least one activated carbon-to-carbon double bond and from about 0.01 to 10.0 percent by weight of a polyunsaturated cross-linking agent containing a plurality of polymerizable polyalkenyl groups, oil-in-water emulsifier, water and nitrous oxide dissolved in said emulsion.

2. A pressurized emulsion which has an oily phase and an aqueous phase and which produces a quick breaking foam after pressure is released and the pressurizing gas expands and said foam breaks substantially completely within from 1 to 15 seconds to atmospheric pressure, comprising by weight, based on the total weight of the emulsion, about 5 to 60 percent of water insoluble oil, about 0.1 to 0.5 percent of substantially completely neutralized hydrophilic cross-linked interpolymer of a mono-olefinic monomer comprising at least about 25 percent by weight of an olefinically unsaturated carboxylic acid containing at least one activated carbon-to-carbon double bond and from about 0.01 to 10.0 percent by weight of a polyunsaturated cross-linking agent containing a plurality of polymerizable polyalkenyl groups, about 0.5 to 10 percent of oil-in-water emulsifier, about 40 to 94 percent of water and a sufficient amount of nitrous oxide dissolved in said emulsion to produce a quick breaking foam when pressure is released.

3. A pressurized emulsion which has an oily phase and an aqueous phase and which produces a quick breaking foam after pressure is released and the pressurizing gas expands and said foam breaks substantially completely within from 1 to 15 seconds in the atmosphere, comprising by weight, based on the total weight of the emulsion, about 5 to 60 percent of water insoluble oil, about 0.1 to 0.5 percent of substantially completely neutralized hydrophilic cross-linked interpolymer of a mono-olefinic monomer comprising at least about 25 percent by weight of an olefinically unsaturated carboxylic acid containing at least one activated carbon-to-carbon double bond and from about 0.01 to 10.0 percent by weight of a polyether of sucrose in which the modified hydroxyl groups are etherified with alkyl groups, said polyether containing at least two allyl groups per sucrose molecule, about 0.5 to 10 percent of oil-in-water emulsifier, about 40 to 94 percent of water and a sufficient amount of nitrous oxide dissolved in said emulsion to produce a quick breaking foam when pressure is released.

4. A pressurized emulsion which has an oily phase and an aqueous phase and which produces a quick breaking foam after pressure is released and the pressurizing gas expands and said foam breaks substantially completely within from 1 to 15 seconds to the atmosphere, comprising by weight, based on the total weight of the emulsion, about 10 to 40 percent of water insoluble oil 0.2 to 0.4 percent by weight of substantially completely neutralized hydrophilic cross-linked interpolymer of a mono-olefinic monomer comprising at least about 25 percent by weight of an olefinically unsaturated carboxylic acid containing at least one activated carbon-to-carbon double bond and from about 0.01 to 10.0 percent by weight of a polyether of sucrose in which the modified hydroxyl groups are etherified with allyl groups, said polyether containing at least two allyl groups per sucrose molecule, about 1 to 3 percent of oli-in-water emulsifier, about 50 to 70 percent of water and a sufficient amount of nitrous oxide dissolved in said emulsion to produce a quick breaking foam when pressure is released.

5. A pressurized emulsion which has an oily phase and an aqueous phase and which produces a quick breaking foam after pressure is released and the pressurizing gas expands and said foam breaks substantially completely within from 1 to 15 seconds to the atmosphere, comprising by weight, based on the total weight of the emulsion, about 10 to 40 percent of water insoluble oil, about 0.2 to 0.4 percent of substantially completely neutralized hydrophilic cross-linked interpolymer of a mono-olefinic monomer comprising at least about 25 percent by weight of an olefinically unsaturated carboxylic acid containing at least one activated carbon-to-carbon double bond and from about 0.01 to 10.0 percent by weight of a polyunsaturated cross-linking agent containing a plurality of polymerizable polyalkenyl groups, about 1 to 3 percent of oil-in-water emulsifier, about 50 to 70 percent of water and a sufficient amount of nitrous oxide dissolved in said emulsion to produce a quick breaking foam when pressure is released.

6. A pressurized emulsion as defined in claim 5 wherein the polymer is a copolymer of acrylic acid and polyallyl alcohol.

7. A pressurized emulsion as defined in claim 5 wherein the polymer is a copolymer consisting of 99 percent by weight acrylic acid and 1 percent by weight of polyallyl sucrose in which the sucrose molecule has an average of about 5 to 6 allyl groups.

8. A pressurized emulsion which has an oily phase and an aqueous phase and which produces a quick breaking foam after pressure is released and the pressurizing gas expands and said foam breaks substantially completely within from 1 to 15 seconds in the atmosphere, comprising by weight, based on the total weight of the emulsion, about 5 to 60 seconds of at least one water insoluble oil selected from the group consisting of saturated and unsaturated hydrocarbon oils and higher molecular weight fatty acid esters, 0.1 to 0.5 percent of a hydrophilic cross-linked interpolymer comprising at least about 25 percent by weight of an olefinically unsaturated carboxylic acid containing at least one carbon-to-carbon double bond and from about 0.01 to 10.0 percent by weight of a polyunsaturated cross-linking agent containing a plurality of polymerizable polyalkenyl groups, a sufficient amount of at least one alkaline neutralizing agent to substantially completely neutralize said interpolymer, about 0.5 to 10 percent of at least one oil-in-water emulsifier, about 40 to 94 percent of water and a sufficient amount of nitrous oxide dissolved in said emulsion to produce a quick breaking foam when pressure is released.

9. A pressurized emulsion which has an oily phase and an aqueous phase and which produces a quick breaking foam after pressure is released and the pressurizing gas expands and said foam breaks substantially completely within from 1 to 15 seconds in the atmosphere, comprising by weight, based on the total weight of the emulsion, about 5 to 60 percent of at least one water insoluble oil, about 0.1 to 0.5 percent of a hydrophilic cross-linked interpolymer comprising at least about 25 percent by weight of an olefinically unsaturated carboxylic acid containing at least one carbon-to-carbon double bond and from about 0.01 to 10 percent by weight of a polyunsaturated cross linking agent containing a plurality of polymerizable polyalkenyl groups, a sufficient amount of at least one alkaline neutralizing agent to substantially completely neutralize said interpolymer, about 0.5 to 10 percent of at least one oil-in-water emulsifier, about 40 to 94 percent of water and a sufficient amount of nitrous oxide to produce a quick breaking foam when pressure is released, said emulsion being pressurized under pressure in a range of about 60 to 200 pounds per square inch gauge with said nitrous oxide dissolved in said emulsion and an inert gas in a ratio of about 10 parts nitrous oxide to 1 part inert gas.

10. A pressurized hair dressing emulsion which has an oily phase and an aqueous phase and which produces a quick breaking foam after pressure is released and the pressurizing gas expands in the atmosphere and said foam breaks substantially completely within from 1 to 15 seconds, comprising by weight, based on the total weight of the emulsion, about 5 to 60 percent of at least one water insoluble oil, about 0.1 to 0.5 percent of a hydrophilic cross-linked interpolymer comprising at least about 25 percent by weight of an olefinically unsaturated carboxylic acid containing at least one carbon-to-carbon double bond and from about 0.01 to 10 percent by weight of a polyunsaturated cross linking agent containing a plurality of polymerizable polyalkenyl groups, a sufficient amount of at least one alkaline neutralizing agent to substantially completely neutralize said interpolymer about 0.5 to 10 percent of at least one oil-in-water emulsifier, about 40 to 94 percent of water and about 0.2 to 1.5 percent of nitrous oxide dissolved in said emulsion, to produce a quick breaking foam when pressure is released, said emulsion being pressurized under a pressure in a range of about 75 to 160 pounds per square inch gauge with a sufficient amount of a mixture of nitrous oxide and nitrogen.

11. A pressurized hair dressing emulsion which has an oily phase and an aqueous phase and which produces a quick breaking foam after pressure is released and the pressurizing gas expands in the atmosphere and said foam breaks substantially completely within from 1 to 15 seconds, comprising by weight, based on the total weight of the emulsion, about 5 to 60 percent of at least one water insoluble oil, about 0.1 to 0.5 percent of substantially completely neutralized hydrophilic cross-linked interpolymer comprising at least about 25 percent by weight of an olefinically unsaturated carboxylic acid containing at least one carbon-to-carbon double bond and from about 0.2 to 0.4 percent by weight of a polyunsaturated cross linking agent containing a plurality of polymerizable polyalkenyl groups, a sufficient amount of at least one alkaline neutralizing agent to substantially completely neutralize said interpolymer about 1 to 3 percent of at least one oil-in-water emulsifier, about 50 to 70 percent of water and about 0.4 to 0.8 percent of nitrous oxide dissolved in said emulsion, to produce a quick breaking foam when pressure is released, said emulsion being pressurized under a pressure in a range of about 75 to 160 pounds per square inch gauge with a sufficient amount of a mixture of nitrous oxide and nitrogen.

12. A pressurized sun screen emulsion which has an oily phase and an aqueous phase and which produces a quick breaking foam after pressure is released and the pressurizing gas expands in the atmosphere and said foam breaks substantially completely within from 1 to 15 seconds, comprising by weight, based on the total weight of the emulsion, about 5 to 60 percent of at least one water insoluble oil, about 0.1 to 0.5 percent of a hydrophilic cross linked interpolymer comprising at least about 25 percent by weight of an olefinically unsaturated carboxylic acid containing at least one carbon-to-carbon double bond and from 0.01 to 10 percent of a polyunsaturated cross linking agent containing a plurality of polymerizable polyalkenyl groups, a sufficient amount of at least one alkaline neutralizing agent to substantially completely neutralize said interpolymer, about 0.5 to 10 percent of at least one oil-in-water emulsifier, about 1 to 10 percent of an ultraviolet absorbing agent, about 2 to 15 percent of an insect repellent, about 40 to 91 percent of water and a sufficient amount of nitrous oxide dissolved in said emulsion to produce a quick breaking foam when pressure is released, said emulsion being pressurized under a pressure in a range of about 60 to 200 pounds per square inch gauge with said nitrous oxide and an inert gas in a ratio of about 10 parts nitrous oxide to 1 part inert gas.

13. A sun screen emulsion as defined in claim 12 wherein the ultraviolet absorbing agent is N,-N-dimethyl isoamyl para-amino benzoate.

14. A sun screen emulsion as defined in claim 12 wherein the ultraviolet absorbing agent is homomenthyl salicylate.

15. A sun screen emulsion as defined in claim 13 wherein the insect repellent is meta diethyl toluamide.

16. A process for preparing a quick breaking emulsion which has an oily phase and an aqueous phase and which produces a quick breaking foam after pressure is released and the pressurizing gas expands in the atmosphere and said foam breaks substantially completely within from 1 to 15 seconds comprising mixing together by weight, based on the total weight of the emulsion, at a temperature in a range of about 25° C. to 80° C., while constantly agitating the mixture, about 5 to 60 percent of at least one water insoluble oil and about 0.5 to 10 percent of at least one oil-in-water emulsifier, adding about 0.1 to 0.5 percent of carboxy vinyl polymer dissolved in water to the mixture, said polymer comprising by weight, based on the total weight thereof, at least 25 percent of an olefinically unsaturated carboxylic acid containing at least one carbon-to-carbon double bond and from about 0.01 to 10.0 percent of a polyunsaturated cross-linking agent containing a plurality of polymerizable polyalkenyl groups, adding a sufficient amount of an alkaline neutralizing agent to the mixture to substantially completely neutralize said polymer, obtaining a stable emulsion, having present therein about 40 to 94 percent of water and pressurizing said emulsion to about 60 to 200 pounds per square inch gauge pressure with an inert gas and nitrous oxide and dissolving said nitrous oxide in said emulsion.

17. A pressurized emulsion of an oily phase and an aqueous phase which, when pressure thereon is released, produces a foam which breaks substantially completely within from about 1 to about 15 seconds, comprising by weight, based on the total weight of the emulsion, about 26 parts of mineral oil, about 8 parts of petrolatum, about 1 part of polyethylene glycol monococate, about 3 parts of paraffin wax, about 0.125 part of a nonionic emulsifier comprising an ethylene oxide-fatty alcohol and lanolin complex, about 0.099 part of lauryl amine, about 14.1 parts of a 1 percent aqueous solution of a copolymer of about 99 percent by weight of glacial acrylic acid and about 1 percent by weight of polyallyl sucrose in which the sucrose molecule has an average of about 5 to 6 allyl groups, about 38.7 parts of deionized water, about 0.23 part of a 24.6 percent aqueous solution of sodium hydroxide, about 8.0 parts of propylene glycol, and about 0.20 part of perfume, said emulsion being pressurized to about 140 pounds per square inch gauge with nitrous oxide and nitrogen, said nitrous oxide being present in a ratio to said nitrogen of from about 4:1 to about 40:1.

18. A pressurized emulsion of an oily phase and an aqueous phase which, when pressure thereon is released, produces a foam which breaks substantially completely within about 1 to about 15 seconds, comprising water-insoluble oil, substantially neutralized hydrophilic cross-linked interpolymer of a mono-olefinic monomer comprising at least about 25 percent by weight of an olefinically unsaturated carboxylic acid containing at least one activated carbon-to-carbon double bond and from about 0.01 to 10.0 percent by weight of a polyunsaturated cross-linking agent containing a plurality of polymerizable polyalkenyl groups, nonionic oil-in-water emulsifier, water, nitrous oxide, and nitrogen.

(References on following page)

References Cited

UNITED STATES PATENTS

| | | | |
|---|---|---|---|
| 3,092,555 | 6/1963 | Horn | 167—63 |
| 3,099,603 | 7/1963 | Banker | 167—39 |

OTHER REFERENCES

Carbopol (1), Supplement No. 1, March 1959, to "Carbopol 934" Bulletin, 4 pp. (B. F. Goodrich Chem. Co.), Cleveland, Ohio.

Carbopol (2) Supplement No. 4, July 1959 to "Carbopol 934" Bulletin, 4 pp. (B. F. Goodrich Chem. Co.), Cleveland, Ohio.

ALBERT T. MEYERS, *Primary Examiner.*

ANNA P. FAGELSON, *Assistant Examiner.*